US012573137B2

(12) United States Patent
Kim

(10) Patent No.: US 12,573,137 B2
(45) Date of Patent: Mar. 10, 2026

(54) SYSTEM AND METHOD FOR UNSUPERVISED AND AUTONOMOUS 4D DYNAMIC SCENE AND OBJECTS INTERPRETATION, SEGMENTATION, 3D RECONSTRUCTION, AND STREAMING

(71) Applicant: DoubleMe, Inc., Seoul (KR)

(72) Inventor: Heekwan Kim, Seoul (KR)

(73) Assignee: DoubleMe, Inc., Seoul (KR)

( * ) Notice: Subject to any disclaimer, the term of this patent is extended or adjusted under 35 U.S.C. 154(b) by 160 days.

(21) Appl. No.: 18/396,132

(22) Filed: Dec. 26, 2023

(65) Prior Publication Data

US 2024/0221300 A1 Jul. 4, 2024

Related U.S. Application Data

(60) Provisional application No. 63/435,616, filed on Dec. 28, 2022.

(51) Int. Cl.
*G06T 17/00* (2006.01)
*G06T 15/04* (2011.01)
*G06T 15/08* (2011.01)

(52) U.S. Cl.
CPC .............. *G06T 17/00* (2013.01); *G06T 15/04* (2013.01); *G06T 15/08* (2013.01)

(58) Field of Classification Search
CPC ......... G06T 17/00; G06T 15/04; G06T 15/08; H04N 21/816
See application file for complete search history.

(56) References Cited

U.S. PATENT DOCUMENTS

2011/0043613 A1* 2/2011 Rohaly ................ G06V 20/653
                                                    348/E13.074
2022/0222895 A1* 7/2022 Li ........................... G06T 17/20

* cited by examiner

*Primary Examiner* — Haixia Du
(74) *Attorney, Agent, or Firm* — Invent Capture, LLC.; Samuel S. Cho

(57) ABSTRACT

A novel electronic system and its method of operation provide unsupervised and autonomous machine interpretation, segmentation, reconstruction, and streaming of three-dimensional (3D) dynamic scene and objects that contain various movements over a defined period. The elapsed time during the various movements of 3D scenes and objects acts as the fourth dimension, thus representing "4D" contents. The novel electronic system and its method of operation enable real-time and multiple dynamic 3D human object model generation with a novel volumetric prediction error correction logic, which uniquely mitigates frequent volumetric prediction errors that typically occur during computer graphical 3D modeling of fast-moving humans, who are undergoing video or image capture with a recording equipment. The volumetric prediction error correction logic is designed to intelligently enhance the accuracy and the quality of 3D modeling by correcting excessive volumetric prediction errors that often occur during static model generation due to rapid topology changes.

8 Claims, 5 Drawing Sheets

200

A Logic Block Diagram for Real-Time Multiple Dynamic 3D Human Object Model
Generation with Excessive Volumetric Prediction Error Correction Logic

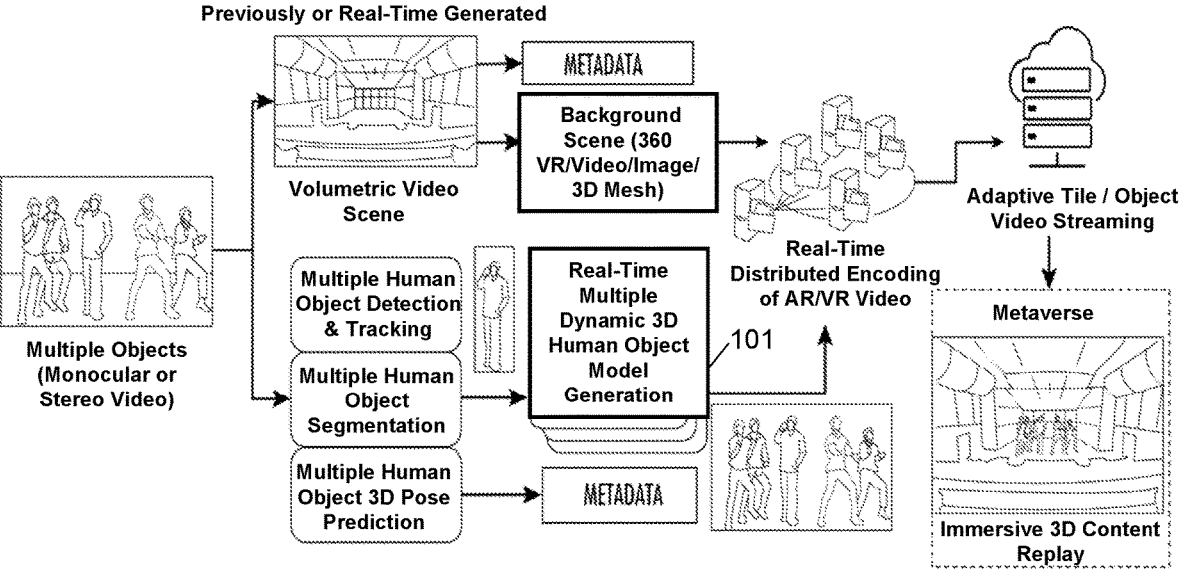

Previously or Real-Time Generated

METADATA

Background Scene (360 VR/Video/Image/ 3D Mesh)

Volumetric Video Scene

Multiple Human Object Detection & Tracking

Multiple Human Object Segmentation

Multiple Human Object 3D Pose Prediction

METADATA

Multiple Objects (Monocular or Stereo Video)

Real-Time Multiple Dynamic 3D Human Object Model Generation

101

Real-Time Distributed Encoding of AR/VR Video

Adaptive Tile / Object Video Streaming

Metaverse

Immersive 3D Content Replay

User Perspective-Adjusted Scene & 3D Object Video Adaptive Transmission & Playback

100

A High-Level System Diagram for Unsupervised and Autonomous 4D Dynamic Scene and Objects Interpretation, Segmentation, 3D Reconstruction, and Streaming

A Logic Block Diagram for Real-Time Multiple Dynamic 3D Human Object Model
Generation with Excessive Volumetric Prediction Error Correction Logic

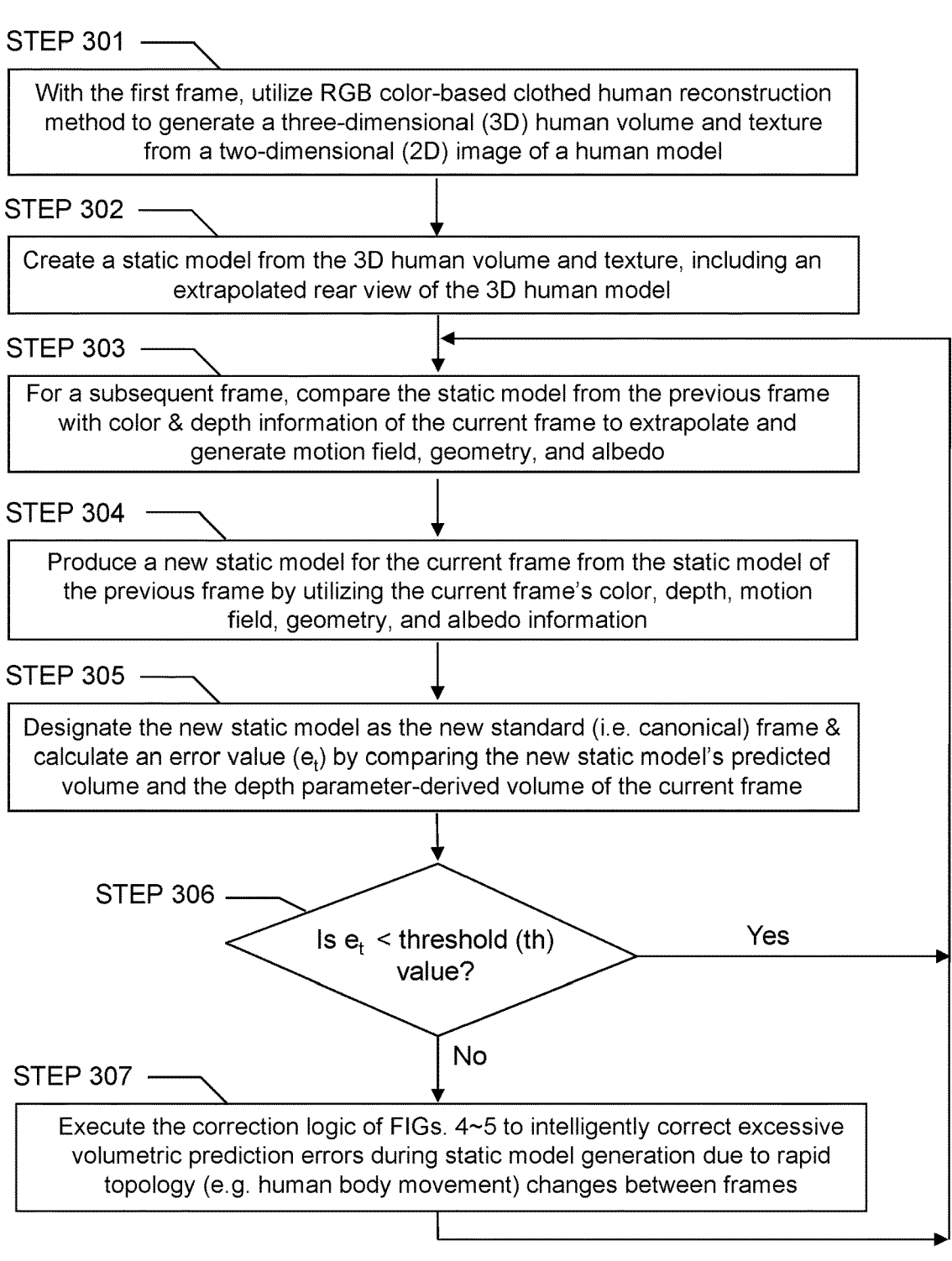

STEP 301

With the first frame, utilize RGB color-based clothed human reconstruction method to generate a three-dimensional (3D) human volume and texture from a two-dimensional (2D) image of a human model

STEP 302

Create a static model from the 3D human volume and texture, including an extrapolated rear view of the 3D human model

STEP 303

For a subsequent frame, compare the static model from the previous frame with color & depth information of the current frame to extrapolate and generate motion field, geometry, and albedo

STEP 304

Produce a new static model for the current frame from the static model of the previous frame by utilizing the current frame's color, depth, motion field, geometry, and albedo information

STEP 305

Designate the new static model as the new standard (i.e. canonical) frame & calculate an error value ($e_t$) by comparing the new static model's predicted volume and the depth parameter-derived volume of the current frame

STEP 306

Is $e_t$ < threshold (th) value?

Yes

No

STEP 307

Execute the correction logic of FIGs. 4~5 to intelligently correct excessive volumetric prediction errors during static model generation due to rapid topology (e.g. human body movement) changes between frames

300

An Operation Flowchart for Real-Time Multiple Dynamic 3D Human Object Model Generation with Excessive Volumetric Prediction Error Correction Logic

A Correction Logic Block Diagram for Correcting Excessive Volumetric Prediction Errors During
Static Model Generation Due to Rapid Topology (e.g. Human Body Movement) Changes

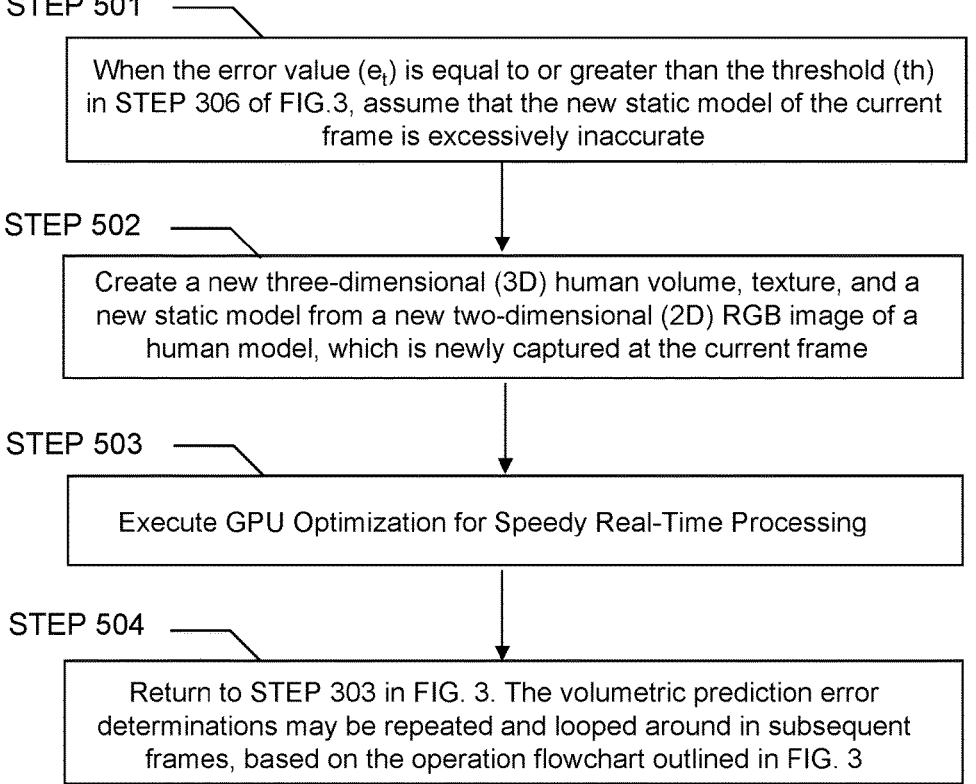

STEP 501

When the error value ($e_t$) is equal to or greater than the threshold (th) in STEP 306 of FIG.3, assume that the new static model of the current frame is excessively inaccurate

STEP 502

Create a new three-dimensional (3D) human volume, texture, and a new static model from a new two-dimensional (2D) RGB image of a human model, which is newly captured at the current frame

STEP 503

Execute GPU Optimization for Speedy Real-Time Processing

STEP 504

Return to STEP 303 in FIG. 3. The volumetric prediction error determinations may be repeated and looped around in subsequent frames, based on the operation flowchart outlined in FIG. 3

500

An Operation Flowchart for Correcting Excessive Volumetric Prediction Errors (i.e. STEP 307 from FIG. 3) During Static Model Generation Due to Rapid Topology Changes

FIG. 5

SYSTEM AND METHOD FOR UNSUPERVISED AND AUTONOMOUS 4D DYNAMIC SCENE AND OBJECTS INTERPRETATION, SEGMENTATION, 3D RECONSTRUCTION, AND STREAMING

BACKGROUND OF THE INVENTION

The present invention generally relates to computer graphics transformation and representation of three-dimensional (3D) physical objects over a defined period of time, with the time acting as the fourth dimension to the graphical transformation of the 3D physical objects. More specifically, the present invention relates to intelligent and autonomous machine interpretation, segmentation, 3D reconstruction, and streaming of four-dimensional (4D) dynamic scenes and objects contained in the 4D dynamic scenes.

Furthermore, the present invention also relates to real-time multiple and dynamic 3D human object model generation using a scalable number of graphical processing units (GPUs) and computer servers. In addition, the present invention also relates to novel logic blocks and related methods of operating the novel logic blocks that can generate multiple dynamic 3D human object models in real time while intelligently correcting excessive volumetric prediction errors with a novel correction logic.

The term "metaverse," which refers to a computer graphics-infused space where users can interact with computer-generated elements and other users, has become a hot buzzword in recent years. In particular, virtual reality (VR) and augmented reality (AR) applications are increasingly gaining popularity and relevance in electronic user applications. For example, VR headsets for computers and portable devices are able to provide interactive and stereoscopic gaming experiences, training simulations, and educational environments for users wearing the VR headsets. In another example, augmented reality (AR) mobile applications are designed to add texts, descriptions, or added (i.e. "augmented") digitized materials to physical objects if a user wears AR goggles or utilizes AR-compatible mobile applications executed in portable devices. For one of ordinary skill in the art, virtual reality (VR) refers to a completely computer-generated synthetic environment with no direct correlations to a real physical space or a real physical object, while augmented reality (AR) refers to descriptive digital materials that are displayed next to a machine-recognized real physical object to add or "augment" more information to the physical reality.

Furthermore, a recent evolution of conventional VR and AR applications has resulted in an innovative intermixture of computer-generated lifelike holographic objects and real objects that are synchronized and correlated to a particular physical space (i.e. as a "mixed-reality" (MR) environment) for immersive user interactions during the user's visit to the particular physical space. Mixed-reality (MR) applications in particular have the potential to increase the relevance of the industry push for "metaverse" worlds in consumer software and electronics. Although mixed-reality (MR), virtual-reality (VR), and augmented-reality (AR) applications have been created and deployed in limited and experimental capacity as computer graphics-aided visualization tools for consumers, creating 3D computer graphics modeling of physical objects and related computerized contents are generally too expensive and time consuming, with significant time delays in processing when the current state of the art equipment is utilized, to make the widespread adoption of MR/VR/AR applications realistic for most content developers and users.

The conventional equipment for 3D computer graphics modeling involves highly-specialized and costly 3D image capture equipment with specialized multiple-angle 3D cameras, dedicated graphics processing servers, and a physical 3D computer modeling studio space in order to create high-quality and computerized 3D volumetric video contents from physical models (e.g. human subjects as models, animals, physical objects, etc.). Although there has been some industry progress in a move towards more simplified and mobile equipment for 3D volumetric model capture and content creations in recent years, speed and accuracy of 3D volumetric modeling remains a significant challenge to 3D content creators and developers, especially with 3D models that embody rapid and/or sudden movements that cannot be predicted correctly with conventional 3D volumetric modeling methods, such as a "dynamic-fusion" method that progressively accumulate 3D model's depth and geometrical changes over time (i.e. multiple time frames during an image capture). While the conventional 3D volumetric modeling methods may be suitable for creating a 3D content based on a slow-moving 3D model with no time restrictions on output delays caused by backend graphical processing requirements, the conventional 3D volumetric modeling methods are simply insufficient to provide high-quality 3D volumetric modeling in real time, especially when a multiple number of 3D models with rapid movements are involved during the image capture and 3D volumetric conversion stages.

Therefore, it may be highly desirable to devise a novel electronic system and a method of operating thereof that can provide unsupervised and autonomous 4D dynamic scene and objects interpretation, segmentation, 3D reconstruction, and streaming in real time with cost-effective image capture and graphical processing equipment.

Furthermore, it may also be highly desirable to devise a novel electronic system and a method of operating thereof that can provide real-time multiple dynamic 3D human object model generation with a novel error correction logic, which remedies excessive volumetric prediction errors that occur while capturing sudden movements by physical human models.

In addition, it may also be highly desirable to devise a novel correction logic and a method of operating thereof that can intelligently correct excessive volumetric prediction errors during a 3D computer-graphics static model generation process due to rapid topology (e.g. human body movement) changes by a subject model.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

A method of operating a real-time multiple dynamic three-dimensional (3D) human object model generation system with excessive volumetric prediction error correction logic is disclosed. In a preferred embodiment of the invention, this method comprises the steps of: (1) utilizing red-green-blue (RGB) color-based clothed human reconstruction to generate a three-dimensional (3D) human volume and texture from a two-dimensional (2D) image of a human model for graphical processing of a first frame among a sequence of recorded frames undergoing 3D object model generation by the real-time multiple dynamic 3D human object model generation system; (2) creating a first static model from the 3D human volume and texture, which includes an extrapolated 3D rear view of the human model; (3) for a second frame, comparing the first static model from the first frame with color and depth information of the second frame to extrapolate and generate motion field, geometry, and albedo of the second frame; (4) producing a second static model for the second frame from the first static model of the first frame by utilizing the second frame's color, depth, motion field, geometry, and albedo information; (5) designating the second static model as a new standard canonical frame and calculating an error value ($e_2$) by comparing the second static model's predicted volume and the depth parameter-derived volume of the second frame; and (6) if the error value ($e_2$) is less than a threshold value (th) representing a trigger point for overly excessive volumetric prediction errors, then executing an iterative loop to process a third frame by comparing the second static model from the second frame with color and depth information of the third frame to extrapolate and generate motion field, geometry, and albedo of the third frame; (7) else if the error value ($e_2$) is equal to or greater than the threshold value (th) representing the trigger point for overly excessive volumetric prediction errors, then executing the excessive volumetric prediction error correction logic to remove, reduce, or improve the overly excessive volumetric prediction errors that frequently occur during a static model generation due to rapid topology changes between frames.

BRIEF DESCRIPTION OF DRAWINGS

FIG. 1 shows a high-level system diagram for unsupervised and autonomous four-dimensional (4D) dynamic scene and objects interpretation, segmentation, three-dimensional (3D) reconstruction, and streaming, in accordance with an embodiment of the invention.

FIG. 3 shows an operation flowchart for real-time multiple dynamic 3D human object model generation with excessive volumetric prediction error correction logic, in accordance with an embodiment of the invention.

FIG. 5 shows an operation flowchart for correcting excessive volumetric prediction errors (i.e. STEP 307 from FIG. 3) during static model generation due to rapid topology changes, in accordance with an embodiment of the invention.

DETAILED DESCRIPTION

Figure 2:
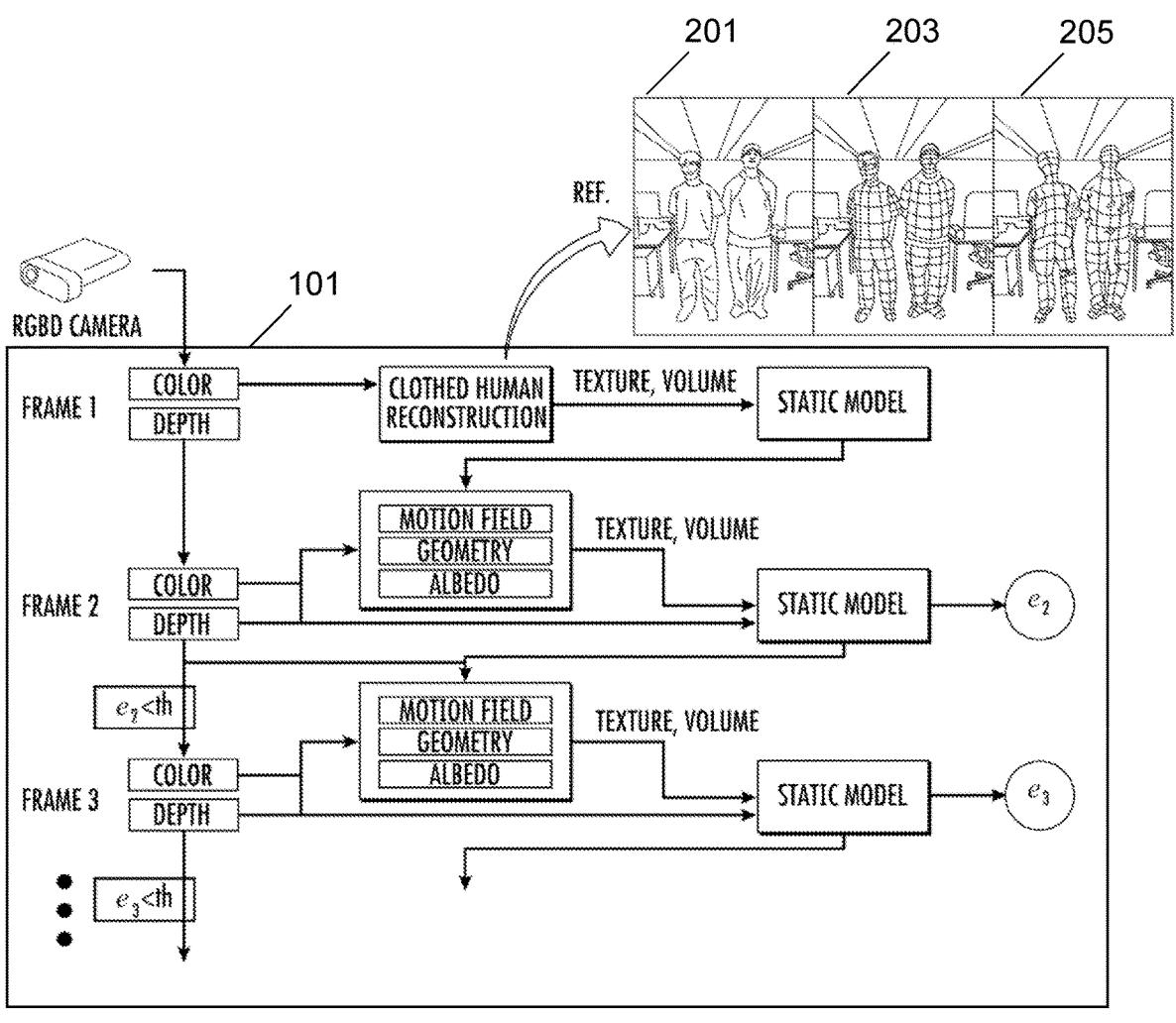
FIG. 2 shows a logic block diagram for real-time multiple dynamic 3D human object model generation system with excessive volumetric prediction error correction logic, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and methods for real-time and multiple dynamic three-dimensional (3D) human object model generation with excessive volumetric prediction error correction logic. These process descriptions and representations are the means used by those experienced or skilled in the art to convey the substance of their work most effectively to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel electronic system and a related method of operation that enable unsupervised and autonomous four-dimensional (4D) dynamic scene and objects interpretation, segmentation, 3D reconstruction, and streaming in real time with cost-effective image capture and graphical processing equipment.

Furthermore, another objective of an embodiment of the invention is to provide a novel electronic system and a related method of operation that enable real-time multiple dynamic 3D human object model generation with a novel error correction logic that can remedy (i.e. remove, reduce, or improve) excessive volumetric prediction errors, which may occur while capturing sudden movements by physical human models.

Another objective of an embodiment of the present invention is to provide a novel electronic system and a related method of operation that enable a novel correction logic to intelligently correct excessive volumetric prediction errors during a 3D computer-graphics static model generation process due to rapid topology (e.g. human body movement) changes by a subject model.

Another objective of an embodiment of the present invention is to provide a novel electronic system and a related method of operation that enable fast and autonomous 3D content generation by an intelligent machine with minimal to no specialist operator interventions during 3D model image capture, graphical processing, and 3D content generation stages.

For the purpose of describing the invention, a term referred to as "mixed reality," or "MR," as an acronym, is defined as an intermixture of computer-generated lifelike holographic objects and real physical objects that are synchronized and correlated to a particular physical space (e.g. a user's room or office) for immersive user interactions during the user's visualization of a computer graphics-aided environment through a head-mounted display (HMD) or another electronic visualization device.

Typically, the computer-generated lifelike holographic objects are ultra high-resolution (e.g. 4K/UHD) or high-resolution (e.g. HD quality or above) three-dimensional synthetic objects that are intermixed and/or juxtaposed to real physical objects, wherein a user immersed in the mixed-reality environment is often unable to distinguish the synthetic nature of the computer-generated lifelike holographic objects and the real physical objects provided by the mixed-reality environment. The user immersed in the mixed-reality environment may be locally present at the particular physical space (e.g. the user's room or office), which is correlated and synchronized with the computer-generated lifelike holographic objects and the real physical objects in one or more mixed-reality artificial layers superimposed on the particular physical space.

Furthermore, for the purpose of describing the invention, a term referred to as a "mixed-reality artificial layer" is defined as a computer-generated graphics layer in which mixed-reality objects (MROs) and mixed-reality holographic humans (e.g. 3D holographic objects that are originally created through 3D model capture and volumetric 3D graphical processing) are created and positioned by the unsupervised and autonomous 4D dynamic scene and objects interpretation, segmentation, 3D reconstruction, and streaming system onto virtual coordinates, which correlate to a particular physical space of a viewer's interest, such as a physical room or a physical office space where the user is presently located.

Moreover, for the purpose of describing the invention, a term referred to as "hologram" is defined as a three-dimensional holographic object configured to be displayed from a head-mounted display (HMD) device, a mobile device executing a mixed-reality visual mobile application, or another electronic device with a visual display unit. Typically, a hologram is capable of being animated as a three-dimensional element over a defined period of time.

In addition, for the purpose of describing the invention, a term referred to as "three-dimensional model," or "3D model," is defined as one or more computer-generated three-dimensional images, videos, or holograms, which are based on physical models, such as physical human models and physical objects. In a preferred embodiment of the invention, a computerized 3D model is created as a hologram after single-angle and/or multi-angle video data are extracted, extrapolated, transformed, and reconstructed by three-dimensional graphics processing algorithms executed in a computer system or in a cloud computing resource comprising a plurality of networked and parallel-processing computer systems. The computer-generated 3D model can then be utilized as a mixed-reality object (MRO) or a humanized mixed-reality hologram (MRH) in a mixed-reality artificial layer superimposed on a particular physical space correlated by virtual coordinates from the unsupervised and autonomous 4D dynamic scene and objects interpretation, segmentation, 3D reconstruction, and streaming system Furthermore, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each perform computerized tasks related to unsupervised and autonomous 4D dynamic scene and objects interpretation, segmentation, 3D reconstruction, and streaming. Likewise, the scalable cloud computing resource can also perform computerized tasks related to real-time multiple dynamic three-dimensional (3D) human object model generations while exhibiting excessive volumetric prediction error correction capabilities. In some embodiments of the invention, the cloud computing resource may also be configured to extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers can enable a real-time or near real-time transformation and reconstruction of 3D models after video recording devices transmit a stream of captured image data to the cloud computing resource.

In addition, for the purpose of describing the invention, a term referred to as "four dimensions" or "4D," is defined as representation of a three-dimensional (3D) physical object and/or a 3D scene over a defined period of time for computerized 3D volumetric modeling, with the time acting as the fourth dimension to the graphical transformation of the 3D physical object and/or the 3D scene. For example, if the 3D physical object makes various movements over the defined period of time, then the animated "4D content" of the computerized 3D model includes the changing shapes and the movements of the 3D physical object over the defined period of time. If the 4D content refers to a changing movement of a physical model over a defined period of time in computer graphical transformations, then the 4D content can be called a "4D object." Likewise, if the 4D content refers to a changing movement of a background or foreground scene over a defined period of time in computer graphical transformation, then the 4D content can be called a "4D dynamic scene," which may also contain either a stationary or dynamic computerized 3D model in the scene.

FIG. 1 shows a high-level system diagram (100) for unsupervised and autonomous four-dimensional (4D) dynamic scene and objects interpretation, segmentation, three-dimensional (3D) reconstruction, and streaming, in accordance with an embodiment of the invention. In this exemplary high-level system diagram (100), multiple dynamic objects (i.e. humans, other objects) are recorded by a monocular or stereo video recording equipment and separated into a volumetric background video scene and multiple objects. In the embodiment of the invention as shown in FIG. 1, the volumetric background video information was present from the outset, and then separated from the multiple objects at the initial processing stage. In another embodiment of the invention, the volumetric background video may not be present in the original recording scene, but instead artificially generated from a separate source at a different timeframe and gets inserted into an immersive 3D content at a later graphical processing stage.

In context of the high-level system diagram (100) in FIG. 1, the multiple objects recorded at the initial stage of image and/or video capture are multiple human musicians (i.e. multiple human objects), whose images and movements are detected, tracked, and segmented by the unsupervised and autonomous 4D dynamic scene and objects interpretation, segmentation, 3D reconstruction, and streaming system. Real-time image detection and movement tracking models may utilize robust image detection models, such as "You Only Look Once" (YOLO) computer vision algorithm and other similar algorithms that can be readily applied to the system implementation. In case of YOLO, it is preferable that the real-time object detection model is utilized in the system after an extensive machine-learning process is already completed by YOLO to categorize various classes of human and non-human objects autonomously and smartly from extracted objects from its computer vision. In one instance, YOLO is capable of predicting up to eighty classes of objects autonomously (i.e. without human intervention).

Furthermore, the unsupervised and autonomous 4D dynamic scene and objects interpretation, segmentation, 3D reconstruction, and streaming system as illustrated in the high-level system diagram (100) incorporates a multiple human object segmentation logic, which performs image segmentation to separate background scenes from foreground object images, and subsequently performs object selection, which can filter out extraneous or non-substantive objects within the foreground object images to keep only substantive objects of interest (e.g. keeping multiple human musicians and their movements on stage over a defined period, while filtering out other objects in the recording). In one embodiment of the invention, the image segmentation process may utilize a "segment anything model" (SAM), or another competent segmentation model to separate background scenes and extraneous objects from foreground images containing multiple musicians and their movements. The unsupervised and autonomous 4D dynamic scene and objects interpretation, segmentation, 3D reconstruction, and streaming system also generates multiple human object 3D pose predictions based on the recorded information, and stores the 3D pose prediction information as metadata associated with multiple human object 3D modeling, as illustrated in the high-level system diagram (100) in FIG. 1.

Continuing with the embodiment of the invention as illustrated in FIG. 1, the segmented images of multiple human objects are transmitted to a real-time multiple dynamic 3D human object model generation system logic block (101), which in turn creates a frame-by-frame three-dimensional (3D) static model for each human object among multiple human objects for every time slice represented in each frame. The computerized static model for each human object generated by the real-time multiple dynamic 3D human object model generation system logic block (101) serves as the graphical basis for a 3D hologram representing each human object in real-time distributed encoding of an immersive 3D video content, which is configured to interact with users in a full or partial 3D computer graphics-generated MR, VR, or AR environment.

Typically, the real-time multiple dynamic 3D human object model generation system logic block (101) is executed in a central processing unit (CPU), a graphical processing unit (GPU), and/or a memory unit of one or more computer servers, which are part of a scalable cloud computing resource, and is operatively connected to external data networks, devices, and servers. In the preferred embodiment of the invention, the real-time multiple dynamic 3D human object model generation system logic block (101) may be implemented as one or more programmable software modules that are stored in a non-volatile data storage unit and dynamically uploaded and executed by the CPU, the GPU, and/or the memory unit of one or more computer servers. In an alternate embodiment of the invention, one or more modules in the real-time multiple dynamic 3D human object model generation system logic block (101) may be implemented at a hardware level as a special-purpose application-specific integrated circuit (ASIC) chip, which incorporates machine-coded and silicon-level hardware logic and functionality of one or modules comprising the real-time multiple dynamic 3D human object model generation system logic block (101) in the unsupervised and autonomous 4D dynamic scene and objects interpretation, segmentation, 3D reconstruction, and streaming system.

As shown in the high-level system diagram (100) in FIG. 1, the output of the real-time multiple dynamic 3D human object model generation system logic block (101) is encoded in a distributed graphical processing architecture while optionally merging with background scene information from the volumetric video scene to produce an immersive MR/VR/AR video content, which is then transmitted and streamed to the users via adaptive tile and object video streaming. The users are able to visualize the 3D interactive content that incorporates holographic 3D models of multiple human objects (e.g. multiple holographic human musicians on stage) in a metaverse environment provided by the unsupervised and autonomous 4D dynamic scene and objects interpretation, segmentation, 3D reconstruction, and streaming system.

FIG. 2 shows a logic block diagram (200) for real-time multiple dynamic 3D human object model generation system with excessive volumetric prediction error correction logic, in accordance with an embodiment of the invention. In this exemplary logic block diagram (200), the real-time multiple dynamic 3D human object model generation system logic block (101), which was also previously illustrated in FIG. 1 as a component of the high-level system diagram (100), is further shown in detail with internal operating blocks that are categorized by multiple processing timeframes. For example, the first frame ("Frame 1") in the real-time multiple dynamic 3D human object model generation system logic block (101) utilizes an initial image capture occurred at the first time slice during recording by a red/green/blue/depth (RGBD) camera. As a case in point, if the frame rate per second (fps) of the recording equipment is 60 fps, then "Frame 1" represents the first of the sixty frames in one second that are captured as individual images.

In the embodiment of the invention as shown in FIG. 2, the real-time multiple dynamic 3D human object model generation system logic block (101) takes color and depth information from the first frame ("Frame 1") among a series of captured frames, and utilizes an RGB color-based clothed human reconstruction technique to generate a three-dimensional (3D) human volume and texture from a two-dimensional (2D) image of a human model (201). Then, the real-time multiple dynamic 3D human object model generation system logic block (101) can create a static model (203) from the 3D human volume and texture as an initial reference model, which also includes an intelligent machine estimation (i.e. extrapolation) of a rear view (205) of the 3D human model, as illustrated in FIG. 2.

Once the initial static model (i.e. 203, 205) from the first frame processing is established, for a subsequent frame, the real-time multiple dynamic 3D human object model generation system logic block (101) can compare the initial static model from the first frame with the color and depth information of the subsequent frame (t) (i.e. "Frame 2," or "current frame" in which t=2) undergoing graphical processing to extrapolate and generate motion field, geometry, and albedo information for the current frame (t=2, or "Frame 2") processing in the logic block diagram (200). The real-time multiple dynamic 3D human object model generation system logic block (101) is now able to produce a new static model for the current frame (t=2, or "Frame 2") from the static model of the previous frame (t=1, or "Frame 1") by utilizing the current frame's color, depth, motion field, geometry, and albedo information, as illustrated in the logic block diagram (200) in FIG. 2.

The new static model for the current frame is then designated as the new standard, or the "canonical" frame, and an error value ($e_t$, where $t=2$) is calculated by comparing the new static model's predicted volume and the depth parameter-derived volume of the current frame. As shown in the logic block diagram (200) in FIG. 2, if $e_2$ is less than a threshold value (th) representing a trigger point for overly excessive volumetric prediction errors (i.e. $e_2<$th), then the real-time multiple dynamic 3D human object model generation system logic block (101) repeats the similar graphical processing method for the next frame processing.

For example, the real-time multiple dynamic 3D human object model generation system logic block (101) can reiterate the same or similar method of comparing the previous frame's (i.e. $t=2$, or "Frame 2") static model with color and depth information of the new current frame (i.e. $t=3$, or "Frame 3") to extrapolate and generate motion field, geometry, and albedo information. With this extrapolated information, a new static model for the new current frame (i.e. $t=3$, or "Frame 3") can be produced from the static model of the previous frame (i.e. $t=2$, or "Frame 2") by utilizing the current frame's color, depth, motion field, geometry, and albedo information. Then, by comparing the new static model's predicted volume and the depth parameter-derived volume of the new current frame, the new current frame's error value ($e_3$) can be calculated.

Figure 4:
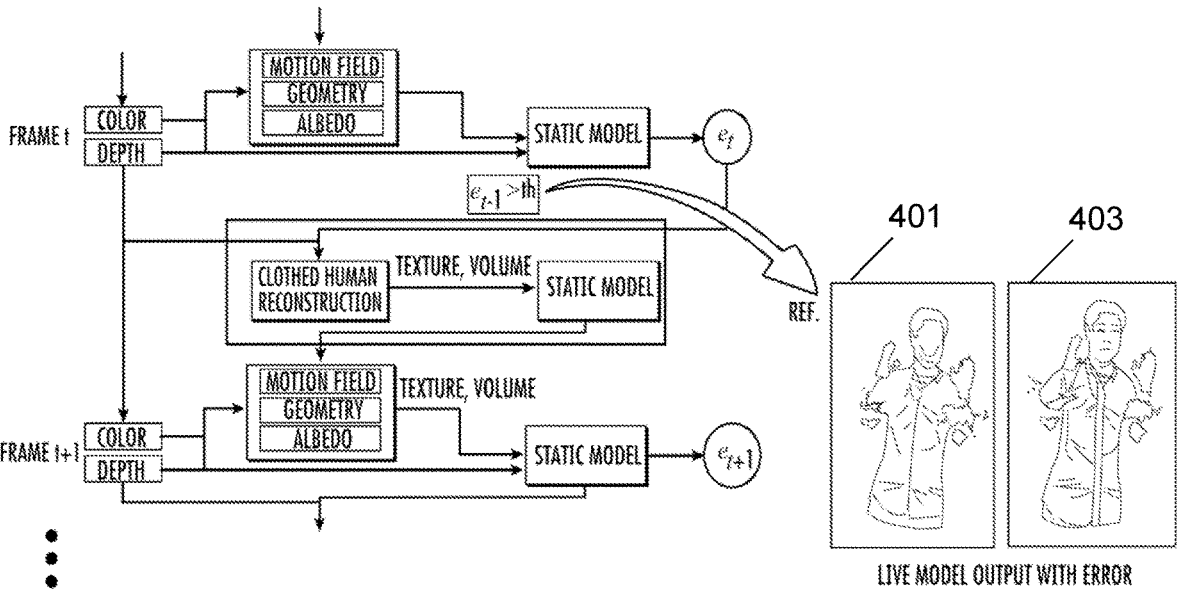
FIG. 4 shows a correction logic block diagram for correcting excessive volumetric prediction errors during static model generation due to rapid topology (e.g. human body movement) changes, in accordance with an embodiment of the invention.

At any point during the multi-frame graphical processing as illustrated in the logic block diagram (200) in FIG. 2, if the error value ($e_t$) calculated for the current frame (t) is equal to or greater than the threshold value (th) that represents a system-defined trigger point for overly excessive volumetric prediction errors, then the real-time multiple dynamic 3D human object model generation system logic block (101) is configured to execute the correction logic as shown in FIGS. 4~5 to intelligently correct excessive volumetric prediction errors during static model generation, which may typically occur during rapid topology changes between frames. In the preferred embodiment of the invention, a common cause of rapid topology changes between the recorded frames is fast human body movements or other fast movements by another object undergoing video recording.

FIG. 3 shows an operation flowchart (300) for real-time multiple dynamic 3D human object model generation with excessive volumetric prediction error correction logic, in accordance with an embodiment of the invention. Typically, this operation flowchart (300) is executed by the real-time multiple dynamic 3D human object model generation system logic block (101), which is previously illustrated and described as a system component in FIGS. 1~2.

As shown in STEP 301 of the operation flowchart (300), the real-time multiple dynamic 3D human object model generation logic block takes color and depth information from the first frame ("Frame 1") among a series of captured frames, and utilizes an RGB color-based clothed human reconstruction technique to generate a three-dimensional (3D) human volume and texture from a two-dimensional (2D) image of a human model (e.g. 201 in FIG. 2). Then, as shown in STEP 302, the real-time multiple dynamic 3D human object model generation logic block can create a static model (e.g. 203 in FIG. 2) from the 3D human volume and texture as an initial reference model, which also includes an intelligent machine estimation (i.e. extrapolation) of a rear view (e.g. 205 in FIG. 2) of the 3D human model.

Once the initial static model (e.g. 203, 205 in FIG. 2) from the first frame processing is established, for a subsequent frame, the real-time multiple dynamic 3D human object model generation logic block can compare the initial static model from the first frame with the color and depth information of the subsequent frame (t) (i.e. "Frame 2," or "current frame" in which $t=2$) undergoing graphical processing to extrapolate and generate motion field, geometry, and albedo information for the current frame ($t=2$, or "Frame 2") processing, as shown in STEP 303. The real-time multiple dynamic 3D human object model generation logic block is now able to produce a new static model for the current frame ($t=2$, or "Frame 2") from the static model of the previous frame ($t=1$, or "Frame 1") by utilizing the current frame's color, depth, motion field, geometry, and albedo information, as shown in STEP 304.

The new static model for the current frame is then designated as the new standard, or the "canonical" frame, and an error value ($e_t$, where $t=2$) is calculated by comparing the new static model's predicted volume and the depth parameter-derived volume of the current frame, as shown in STEP 305. If $e_2$ is less than a threshold value (th) representing a trigger point for overly excessive volumetric prediction errors (i.e. $e_2<$th), as shown in STEP 306, then the real-time multiple dynamic 3D human object model generation logic block repeats the similar graphical processing method for the next frame processing by looping back to STEP 303, as shown in the operation flowchart (300) in FIG. 3.

For example, in a subsequent loopback processing stage, the real-time multiple dynamic 3D human object model generation logic block can reiterate the same or similar method of comparing the previous frame's (i.e. $t=2$, or "Frame 2") static model with color and depth information of the new current frame (i.e. $t=3$, or "Frame 3") to extrapolate and generate motion field, geometry, and albedo information. With this extrapolated information, a new static model for the new current frame (i.e. $t=3$, or "Frame 3") can be produced from the static model of the previous frame (i.e. $t=2$, or "Frame 2") by utilizing the current frame's color, depth, motion field, geometry, and albedo information. Then, by comparing the new static model's predicted volume and the depth parameter-derived volume of the new current frame, the new current frame's error value ($e_3$) can be calculated.

On the other hand, at STEP 306 in the operation flowchart (300), if the error value ($e_t$) calculated for the current frame (t) is equal to or greater than the threshold value (th) that represents a system-defined trigger point for overly excessive volumetric prediction errors, then the real-time multiple dynamic 3D human object model generation logic block is configured to execute the correction logic as shown in FIGS. 4~5 to intelligently correct excessive volumetric prediction errors during static model generation, which may typically occur during rapid topology changes between frames, as shown in STEP 307. In the preferred embodiment of the invention, a common cause of rapid topology changes between the recorded frames is fast human body movements or other fast movements by another object undergoing video recording.

FIG. 4 shows a correction logic block diagram (400) for correcting excessive volumetric prediction errors during static model generation due to rapid topology (e.g. human body movement) changes, in accordance with an embodiment of the invention. As previously shown and described in conjunction with FIGS. 2~3, the correction logic block for correcting excessive volumetric prediction errors during static model generation is utilized when and if the error value ($e_t$) calculated for the current frame (t) is equal to or greater than the threshold value (th) that represents a system-defined trigger point for overly excessive volumetric prediction errors from the real-time multiple dynamic 3D human object model generation logic block (i.e. 101 in FIG. 2) during STEP 306 in FIG. 3. Examples of overly excessive volumetric prediction errors are demonstrated as erroneous live model graphical outputs (401, 403), as shown in FIG. 4.

In context of the correction logic block diagram (400), the correction logic block at this initial stage of execution assumes that the new static model of the current frame (t) is excessively inaccurate, and thus utilizes the RGB color-based clothed human reconstruction technique freshly again (i.e. executing steps similar to STEPs 301~302 freshly within STEP 307 in FIG. 3) to generate a new three-dimensional (3D) human volume, texture, and a new static model from a new two-dimensional (2D) image of a human model, which is newly captured at the current frame (t). In the preferred embodiment of the invention, the correction logic block in FIG. 4 can execute GPU optimizations for speedy real-time processing of the new 3D human volume, texture, and static model creations, and then return to STEP 303 in FIG. 3. The volumetric prediction error determinations may be repeated and looped around in subsequent frames for accurate generations and refinements of the static models in subsequent frames (i.e. "Frame t," "Frame t+1," "Frame t+2," . . . , "Frame t+n"), especially for fast movements by humans or other objects under recording that cause rapid topology changes during 3D computer graphics transformations.

FIG. 5 shows an operation flowchart (500) for correcting excessive volumetric prediction errors (i.e. STEP 307 from FIG. 3) during static model generation due to rapid topology changes, in accordance with an embodiment of the invention. As described previously, the correction logic block for correcting excessive volumetric prediction errors during static model generation is utilized when and if the error value (e$_t$) calculated for the current frame (t) is equal to or greater than the threshold value (th) that represents a system-defined trigger point for overly excessive volumetric prediction errors from the real-time multiple dynamic 3D human object model generation logic block (i.e. 101 in FIG. 2) during STEP 306 in FIG. 3.

In context of the operation flowchart (500) for the correction logic block, the correction logic block at the first stage of execution assumes that the new static model of the current frame (t) is excessively inaccurate when the error value (e$_t$) is greater or equal to the threshold (th), as shown in STEP 501. The correction logic block then utilizes the RGB color-based clothed human reconstruction technique freshly again (i.e. executing steps similar to STEPs 301~302 freshly within STEP 307 in FIG. 3) to generate a new three-dimensional (3D) human volume, texture, and a new static model from a new two-dimensional (2D) image of a human model, which is newly captured at the current frame (t), as shown in STEP 502. Furthermore, as shown in STEP 503, the correction logic block can execute GPU optimizations for speedy real-time processing of the new 3D human volume, texture, and static model creations, after which the correction logic block can direct the next process to return to STEP 303 in FIG. 3, as shown in STEP 504 of FIG. 5. The volumetric prediction error determinations may be repeated and looped around in subsequent frames for accurate generations and refinements of the static models in subsequent frames (i.e. "Frame t," "Frame t+1," "Frame t+2," . . . , "Frame t+n," wherein "n" is the remaining number of frames undergoing graphical processing after "Frame t"), especially for fast movements by humans or other objects under recording that cause rapid topology changes during 3D computer graphics transformations.

Various embodiments of the real-time multiple dynamic three-dimensional (3D) human object model generation system with excessive volumetric prediction error correction logic and the methods of operating thereof described herein provide significant and unique advantages to conventional ways of 3D model image capture, graphical processing, and 3D content generation. For example, one advantage of the novel system and the method of operating thereof is enabling unsupervised and autonomous four-dimensional (4D) dynamic scene and objects interpretation, segmentation, 3D reconstruction, and streaming in real time with cost-effective image capture and graphical processing equipment.

Furthermore, another advantage of the novel system and the method of operating thereof is enabling real-time multiple dynamic 3D human object model generation with a novel error correction logic that can remedy excessive volumetric prediction errors, which tend to occur while capturing sudden movements by physical human models. Moreover, another advantage of the novel system and the method of operating thereof is enabling a novel correction logic to intelligently correct excessive volumetric prediction errors during a 3D computer-graphics static model generation process due to rapid topology (e.g. human body movement) changes by a subject model. In addition, another advantage of the novel system and the method of operating thereof is enabling fast and autonomous 3D content generation by an intelligent machine with minimal to no specialist operator interventions during 3D model image capture, graphical processing, and 3D content generation stages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A method of operating a real-time multiple dynamic three-dimensional (3D) human object model generation system with excessive volumetric prediction error correction logic comprises the steps of:

utilizing red-green-blue (RGB) color-based clothed human reconstruction to generate a three-dimensional (3D) human volume and texture from a two-dimensional (2D) image of a human model for graphical processing of a first frame among a sequence of recorded frames undergoing 3D object model generation by the real-time multiple dynamic 3D human object model generation system;

creating a first static model from the 3D human volume and texture, which includes an extrapolated 3D rear view of the human model;

for a second frame, comparing the first static model from the first frame with color and depth information of the second frame to extrapolate and generate motion field, geometry, and albedo of the second frame;

producing a second static model for the second frame from the first static model of the first frame by utilizing the second frame's color, depth, motion field, geometry, and albedo information;

designating the second static model as a new standard canonical frame and calculating an error value (e$_2$) by comparing a predicted volume of the second static model and a depth parameter-derived volume of the second frame; and if the error value (e$_2$) is less than a threshold value (th) representing a trigger point for overly excessive volumetric prediction errors, then executing an iterative loop to process a third frame by comparing the second static model from the second frame with color and depth information of the third frame to extrapolate and generate motion field, geometry, and albedo of the third frame;

else if the error value ($e_2$) is equal to or greater than the threshold value (th) representing the trigger point for overly excessive volumetric prediction errors, then executing the excessive volumetric prediction error correction logic to remove, reduce, or improve the overly excessive volumetric prediction errors that occur during a static model generation due to topology changes between frames.

2. The method of claim 1, wherein the step of executing the excessive volumetric prediction error correction logic when the error value ($e_2$) is equal to or greater than the threshold value (th) further comprises a first additional step of creating a new 3D human volume and texture and a new static model for the second frame from a new 2D RGB image of the human model, which is newly captured at the second frame.

3. The method of claim 2, wherein the step of executing the excessive volumetric prediction error correction logic when the error value ($e_2$) is equal to or greater than the threshold value (th) further comprises a second additional step of replacing the second static model for the second frame with the new static model derived from the new 2D RGB image of the human model.

4. The method of claim 3, wherein the step of executing the excessive volumetric prediction error correction logic when the error value ($e_2$) is equal to or greater than the threshold value (th) further comprises a third additional step of executing the iterative loop to process the third frame by comparing the new static model of the second frame derived from the new 2D RGB image of the human model with the color and depth information of the third frame to extrapolate and generate the motion field, geometry, and albedo of the third frame.

5. The method of claim 1, wherein the real-time multiple dynamic three-dimensional (3D) human object model generation system is a hardware or software component of an unsupervised and autonomous four-dimensional (4D) dynamic scene and objects interpretation, segmentation, 3D reconstruction, and streaming system.

6. The method of claim 1, wherein the real-time multiple dynamic three-dimensional (3D) human object model generation system is part of a system logic block integrated in an application-specific integrated circuit (ASIC) semiconductor chip as a special-purpose hardware device in one implementation, or alternatively, stored in a non-volatile memory unit of a computer server for execution in a graphical processing unit (GPU), a central processing unit (CPU), and a volatile memory unit of the computer server in another implementation.

7. The method of claim 1, wherein the rapid topology changes between the frames are caused by unpredictable or fast human body movements by the human model over the sequence of recorded frames.

8. The method of claim 1, wherein the first static model and subsequent static models produced by the real-time multiple dynamic three-dimensional (3D) human object model generation system in the sequence of recorded frames represent a computer graphics-generated dynamic 3D human object model that incorporates physical human model movements over multiple frames.

* * * * *